Dec. 7, 1965   G. W. EMMERT ETAL   3,221,996
IRRIGATING DEVICE
Filed Oct. 8, 1963   2 Sheets-Sheet 1

INVENTORS
DOROTHY G. EMMERT
GEORGE W. EMMERT
BY McLaughlin & Cahill
ATTORNEYS

Dec. 7, 1965   G. W. EMMERT ETAL   3,221,996
IRRIGATING DEVICE

Filed Oct. 8, 1963   2 Sheets-Sheet 2

INVENTORS
DOROTHY G. EMMERT
GEORGE W. EMMERT
BY McLaughlin & Cahill
ATTORNEYS

United States Patent Office

3,221,996
Patented Dec. 7, 1965

3,221,996
IRRIGATING DEVICE
George W. Emmert, Tucson, Ariz., and Dorothy G. Emmert, Rte. 5, Box 263, Tucson, Ariz.; said George W. Emmert assignor to said Dorothy G. Emmert
Filed Oct. 8, 1963, Ser. No. 314,700
6 Claims. (Cl. 239—542)

The present invention pertains to irrigators, and more particularly, to irrigation devices suitable for attachment to a garden hose.

When irrigating plants and shrubs it is necessary to make certain the flow of water does not erode the soil at the base of the plant. The kinetic energy of water flowing from an ordinary garden hose represents a substantial eroding force that must be alleviated before the flow of water may feasibly be utilized for irrigation. The usual pressure provided by water systems results in substantial water velocity in most household water supplies. Prior art irrigators and soakers have attempted to remove the kinetic energy of water provided to the soaker at the end of a hose; however, the removal of kinetic energy has frequently resulted in a reduced water flow to the extent that the utilization of a soaker entails an extensive period of time, rendering irrigating a time consuming an inefficient chore. When the rate of flow of water is increased to overcome the problem of time consumption, prior art irrigators failed to sufficiently attenuate the kinetic energy of the water delivered thereby thus resulting in harmful erosion of the soil in the vicinity of the irrigator.

It is also frequently desirable to irrigate a substantial area requiring successive placement of the irrigator to cover the entire irrigable soil with water. For example, if it is necessary to irrigate several rows of plants, prior art irrigators must be placed successively in each row until the row has been supplied with the appropriate amount of water.

It is therefore an object of the present invention to provide an irrigator that may readily be ganged to provide a plurality of water outlets to a single pipe or hose water supply.

It is also an object of the present invention to provide an irrigating device that will readily absorb the kinetic energy of a stream of water while more readily maintaining the rate of flow than prior art irrigation devices.

It is a further object of the present invention to provide an irrigator that will absorb the kinetic energy of a stream of water by successively reversing the flow of the stream while providing a progressively increased volume for the water as its direction is reversed.

It is still another object of the present invention to provide an irrigator that may be constructed to form a single unitary structure that may relatively easily be constructed by known manufacturing techniques.

Further objects and advantages of the present invention will become apparent to those skilled in the art as the description thereof proceeds.

The invention may best be described by reference to the accompanying drawings in which.

Figure 1:
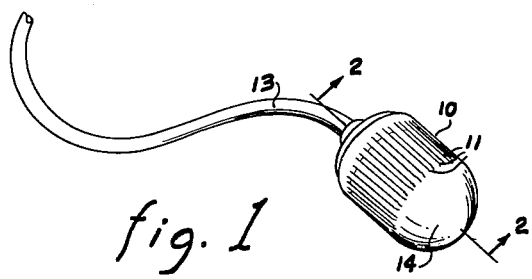
FIGURE 1 is an illustration of an irrigator constructed in accordance with the teachings of the present invention.

Referring to FIGURE 1, the irrigating device shown therein includes a cylindrical shell 10 having longitudinal slots 11 or openings therein. The irrigator is shown connected to a flexible hose 13 for receiving water therefrom. The end of the irrigator remote from the hose is enclosed by a dome-like closure 14 that is formed integral with the remainder of the irrigator. High velocity water from the hose enters the irrigator and is emitted through the longitudinal slots at a very low velocity without sacrificing the rate of flow (i.e. gallons per minute) to the extent necessary in prior art irrigators.

The irrigating device of FIGURE 1 may more readily be explained by reference to FIGURE 2. The cylindrical shell 10 is readily shown in FIGURE 2 and is formed into a unitary structure by joining two sections as will be described more fully hereinafter. The first section 20 forms a dome-shaped closure at one end of the shell and includes the longitudinal slots 11 or openings circumferentially disposed about the shell. The first closure also includes two cylinders 22 and 23 extending inwardly of the shell from the dome-shaped shell closure.

A second closure 24 is provided with an opening 25 having internal female threading 26 suitable for attachment to a standard hose coupling 27. The second closure also includes two cylinders 28 and 29 extending inwardly of the shell, the first of which communicates with the opening 25. The pairs of cylinders extending from the first and second closures overlap to the extent that the fluid path provided thereby (shown by arrow 30) reverses direction in traveling from one cylinder to the next cylinder of succeeding larger diameter. The kinetic energy absorbing feature of the irrigating device shown in FIGURES 1 and 2 is thus provided by the flow reversal in combination with the successively increasing volumes presented to the water as it travels the reversing paths to the longitudinal slots in the cylindrical shell.

Figures 3, 4:
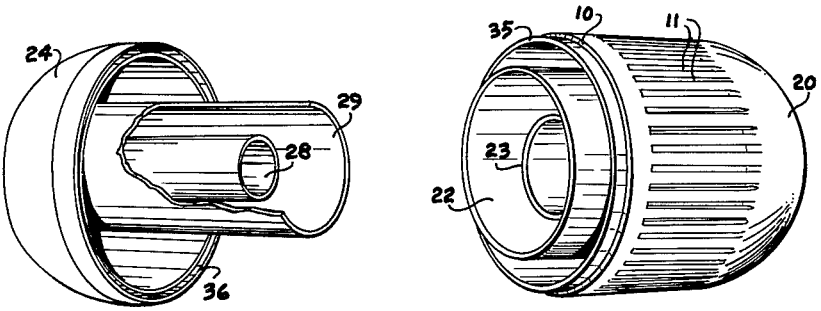
FIGURES 3 and 4 represent an exploded view, partially in section, of the irrigating device of FIGURE 1 useful for describing the manner in which the device of the present invention is manufactured.

Further advantages of the present structure may be seen by reference to FIGURES 3 and 4. The portion of the irrigating device shown in FIGURE 3 is readily constructed from present manufacturing techniques and may be made of any of several well-known plastic substances. The structure of FIGURE 3 includes the closure 24, the opening 25, and cylinders 28 and 29. The molds necessary for the structure of FIGURE 3 are simple, and contain no undercuts that would otherwise complicate the manufacture. The portion of the irrigating device shown in FIGURE 4 may similarly be readily manufactured by existing manufacturing techniques. The molded portion comprises three concentric cylinders, (cylinders 22 and 23, and shell 10) each extending from the dome-shaped closure 10; and, similar to the structure of FIGURE 3, the device is free from undercuts and other difficult-to-manufacture shapes. It may be seen that the cylindrical shell is slightly tapered so that the longitudinal slots therein do not present an undercut to the mold. The cylinders of the embodiments chosen for illustration may conveniently be concentric and, in most instances, will be right circular cylinders. The portions of the irrigating device shown in FIGURES 3 and 4 are readily joined to form a unitary structure by securing one of the portions against rotation while rotating the opposite portion at a high rotational velocity. The two portions are then forced into engagement so that the annular tongue 35 of the portion of FIGURE 4 is forced into the annular groove 36 of the portion of FIGURE 3. The friction developed by the rotation of the two portions relative to each other creates sufficient heat to weld the two portions together to form a single unitary structure that is rugged and inexpensive.

High pressure water provided to the irrigating device of FIGURES 1 through 4 will be subjected to successive flow reversals while the volume presented to the water increases. The result of these two features provides kinetic energy absorption without the great reduction in the rate of flow concomitant with kinetic energy reduction in prior art irrigating devices.

Figure 5:
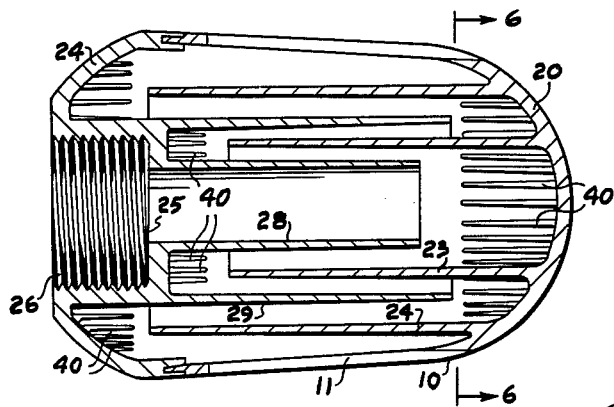
FIGURE 5 is a sectional view of a modification of the irrigating device of FIGURE 2.
Figure 6:
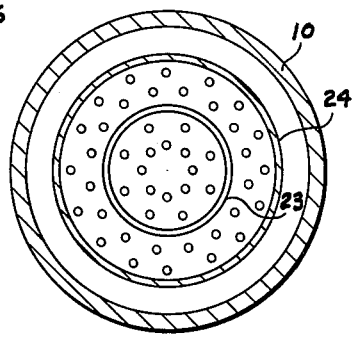
FIGURE 6 is a sectional view of the irrigating device of FIGURE 5 taken along line 6—6.

In these instances where water pressures are exceedingly high, it may be desirable to further absorb kinetic energy by including a modification of the device of FIGURES 1 through 4 such as that shown in FIGURES 5 and 6.

Figure 2:
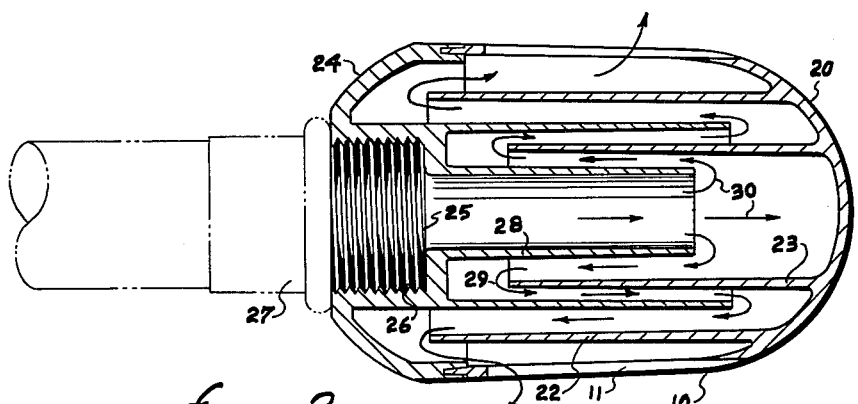
FIGURE 2 is a cross-section of the irrigating device of FIGURE 1 taken along line 2—2.

Referring to FIGURES 5 and 6, it may be seen that the basic structure of the irrigating device shown therein is similar to that of FIGURE 2 with first and second closures each supporting a pair of cylinders extending inwardly of the cylindrical shell. Similar parts of FIGURES 2, 5 and 6 are numbered the same. The cylinders overlap to the extent that the flow path presented to water entering the cylindrical shell is successively reversed to reduce the kinetic energy of the water stream. In the modification shown in FIGURES 5 and 6, a plurality of longitudinal protrusions 40 are provided that extend from each enclosure into the flow path of the water. The protrusions terminate short of the open ends of the cylinders extending from the opposite closure. Thus, water entering through the opening 25 of the second closure 24 would engage the longitudinal protrusionos 40 each time the flow of the water stream was reversed. The protrusions generate turbulence and further adds resistance to the flow of water through and about the protrusions thus further absorbing kinetic energy from the water stream. The basic combination of the irrigating device of the present invention is nevertheless existing in the embodiment shown in FIGURES 5 and 6 wherein the stream of water is subjected to successive reversals while an increasing volume is presented to the water. The embodiment shown in FIGURES 5 and 6 may be constructed to form a unitary structure in the manner similar to that described in connection with FIGURES 3 and 4. The longitudinal protrusions may be slightly tapered and are all parallel to the axis of the cylindrical shell.

Figure 7:
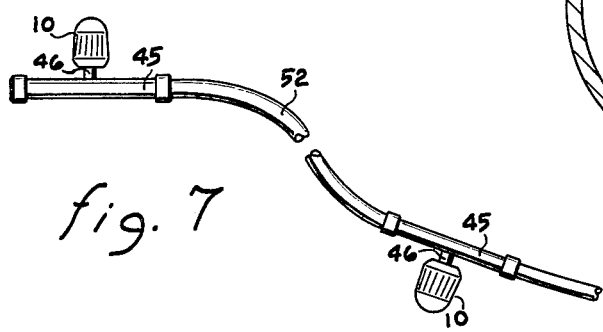
FIGURES 7 and 8 show a modification of the irrigation device of the present invention.
Figure 8:
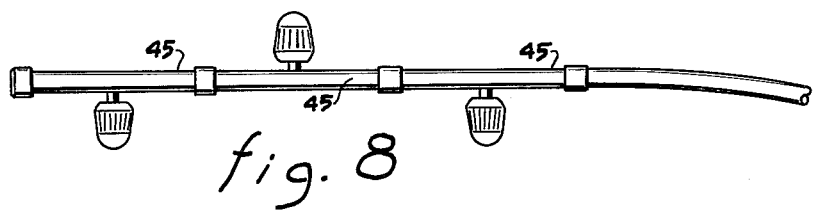
Figure 9:
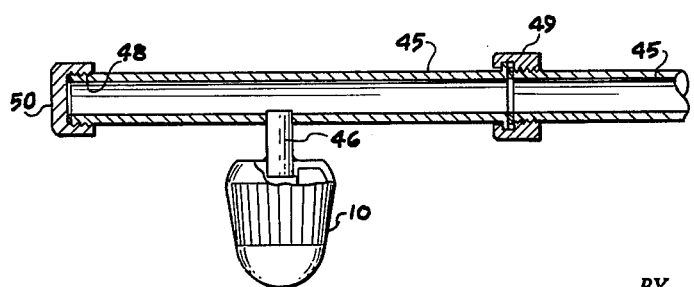
FIGURE 9 is an enlarged view, partially in section, of the embodiment shown in FIGURES 7 and 8.

In those instances where a large area is to be irrigated, and the irrigation of that area would be time consuming if it were necessary to move the single irrigation device shown in FIGURES 1 through 6 from location to location, the embodiment shown in FIGURES 7, 8 and 9 will become most useful. Referring to FIGURES 7 and 9 the cylindrical shell 10 of the type described in connection with FIGURES 1 through 6 is shown secured to a rigid elongated tubular member 45 having a tubular extension 46 for communication with the cylindrical shell. The rigid tubular member is provided with male threads 48 at one end thereof and with a female coupling 49 at the opposite end. The tubular member may be sealed at one end, using a conventional threaded cap 50, and connected to a conventional hose coupling at the other; alternatively, successive tubular members may be connected to form an irrigation device, such as shown in FIGURE 8, having a plurality of water outlets spaced from each other to permit the simultaneous irrigation of a plurality of rows of plants or a large area requiring the application of a large amount of water. The rigid tubular members 45 may also be connected remotely from each other as shown in FIGURE 7 by spacing the respective devices with a conventional garden hose 52. The combination of the flow reversal, the increasing volume presented to the flowing water, and the rigid tubular mounting shown in FIGURES 7, 8 and 9, provide a means for effectively irrigating large or separated areas with a gentle flow of water without erosion from high velocity streams and without time consuming inefficient frequent relocation of water outlets. The device of the present invention represents a unitary structure that may readily be constructed from the present manufacturing techniques at little expense while providing an unusual degree of ruggedness for dependable use over long periods of time. The effective kinetic energy absorption and the attenuation of velocity of the water stream provided by the present invention enable the application of a relatively high rate of water without the concomitant erosion caused by high velocity water streams inherent in the prior art irrigating devices.

While the present invention was described by reference to chosen embodiments, it will be obvious to those skilled in the art that many modifications may be made from the present invention without departing from the spirit and scope intended. For example, the concentric right circular cylinders extending from the closures of the cylindrical shell may readily be made eccentric and constructed to form a variety of shapes. Similarly, the manner in which the inlet to the cylindrical shell is connected to the tubular extension of the rigid tubular member may vary considerably from the simple plastic weld illustrated in connection with FIGURE 9. Accordingly, it is intended that the present invention be limited only by the scope of the claims appended thereto.

We claim:

1. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid; a first cylinder extending inwardly of said shell from said second closure and communicating with said axial opening; a second and third cylinder, each of larger diameter than said first cylinder, extending inwardly of said shell from said first closure and extending over a portion of said first cylinder; a fourth cylinder having a diameter intermediate said second and third cylinders extending from said second closure between said second and third cylinders to provide counter-flowing paths for liquid entering said axial opening and leaving through said circumferential openings.

2. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid; a first plurality of cylinders of progressively larger diameter extending from said first closure; a second plurality of cylinders of progressively larger diameter extending from said second closure; said first and second plurality of cylinders alternately overlapping to provide counter-flowing paths for liquid entering said axial opening and leaving through said circumferential openings.

3. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid; a first plurality of cylinders of progressively larger diameter extending from said first closure and concentric with said cylindrical shell; a second plurality of cylinders of progressively larger diameter extending from said second closure and concentric with said cylindrical shell; said first and second plurality of cylinders alternately overlapping to provide counterflowing paths for liquid entering said axial opening and leaving through said circumferential openings.

4. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid, a plurality of longitudinal protrusions extending axially from said first and second closures; first cylindrical means communicating with said axial opening and extending into said shell from said second closure; second cylindrical means extending into said shell from said first closure and extending over a portion of said first cylindrical means to provide counterflowing path for liquid entering said axial opening and leaving through said circumferential openings.

5. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid; a first plurality of cylinders of progressively larger diameter extending from said first closure; a second plurality of cylinders of progressively larger diameter extending from said second closure; said first and second plurality of cylinders alternately overlapping to provide counterflowing paths for liquid entering said axial opening and leading through said circumferential openings; a plurality of longitudinal protrusions extending axially from said first and second closures and terminating short of the open ends of said cylinders extending from said second and first closures respectively to impede the flow of liquid from one cylinder to the other.

6. An irrigating device comprising: a cylindrical shell including a plurality of longitudinally extending circumferential openings therein to permit liquid to pass therethrough; means forming a unitary structure with said shell defining a first closure for one end thereof, said circumferential openings extending through said first closure; means forming a unitary structure with said shell defining a second closure for the opposite end thereof and including an axial opening to admit liquid; a first cylinder extending inwardly of said shell from said second closure and communicating with said axial opening; a second and a third cylinder each of larger diameter than said first cylinder, extending inwardly of said shell from said first closure and extending over a portion of said first cylinder; a fourth cylinder having a diameter intermediate said second and third cylinders extending from said second closure between said second and third cylinders to provide counterflowing paths for liquid entering said axial opening and leading to said circumferential openings, and a plurality of longitudinal protrusions extending axially from said first and second closures and terminating short of the open ends of said cylinders extending from said second and first closures respectively.

References Cited by the Examiner
UNITED STATES PATENTS

| | | | |
|---|---|---|---|
| 1,883,656 | 10/1932 | Estock | 239—542 |
| 1,996,884 | 4/1935 | Schellin | 239—590 |
| 2,037,145 | 4/1936 | Palermo | 239—542 |
| 2,324,234 | 7/1943 | Peters. | |
| 2,504,506 | 4/1950 | Du-For | 239—553 |
| 2,529,499 | 11/1950 | Jankelson | 239—553 |
| 2,562,328 | 7/1951 | Null | 239—542 |
| 2,723,879 | 11/1955 | Martin | 239—542 |
| 2,760,819 | 8/1956 | Thomas | 239—542 |
| 3,034,733 | 5/1962 | Brooks et al. | 239—542 |
| 3,058,670 | 10/1962 | Marotto et al. | 239—542 |

EVERETT W. KIRBY, *Primary Examiner.*